(12) United States Patent
Sugimoto et al.

(10) Patent No.: US 7,686,444 B2
(45) Date of Patent: Mar. 30, 2010

(54) WATER-BASED INK FOR INK-JET RECORDING AND INK-JET RECORDING METHOD

(75) Inventors: Junichiro Sugimoto, Toyoake (JP); Masashi Tsuda, Ichinomiya (JP); Ryuji Kato, Aisai (JP); Narumi Koga, Nagoya (JP); Masaya Fujioka, Nagoya (JP); Shunichi Higashiyama, Yokkaichi (JP)

(73) Assignee: Brother Kogyo Kabushiki Kaisha (JP)

( * ) Notice: Subject to any disclaimer, the term of this patent is extended or adjusted under 35 U.S.C. 154(b) by 819 days.

(21) Appl. No.: 11/403,237

(22) Filed: Apr. 13, 2006

(65) Prior Publication Data

US 2006/0232651 A1 Oct. 19, 2006

(30) Foreign Application Priority Data

Apr. 15, 2005 (JP) .......................... P2005-119008

(51) Int. Cl.
*C09D 11/00* (2006.01)

(52) U.S. Cl. .................................... 347/100; 106/31.13

(58) Field of Classification Search .................. 347/100; 106/31.13

See application file for complete search history.

(56) References Cited

U.S. PATENT DOCUMENTS

| 6,513,923 B1 * | 2/2003 | Evans et al. ................. 347/100 |
| 6,596,065 B2 | 7/2003 | Ito et al. |
| 2002/0060716 A1 * | 5/2002 | Kato et al. ..................... 347/43 |
| 2003/0056687 A1 * | 3/2003 | Sano ......................... 106/31.6 |
| 2004/0103818 A1 * | 6/2004 | Kataoka et al. .......... 106/31.27 |

* cited by examiner

*Primary Examiner*—Stephen D Meier
*Assistant Examiner*—Laura E Martin
(74) *Attorney, Agent, or Firm*—Banner & Witcoff, Ltd.

(57) ABSTRACT

A water-based ink for ink-jet recording and an ink-jet recording method allow the formation of sharp text and lines in high density black, and the formation of a high quality gradation image in which the graininess is reduced in a black image of a medium lightness to a high lightness (e.g., an achromatic image in dark gray to light gray) in ink-jet recording. The water-based ink combination for ink-jet recording comprises a black ink, and a color ink (A) and a color ink (B) that satisfy a color relationship of the following expression (I):

about $120° \leq |\alpha-\beta| \leq$ about $240°$ (I)

wherein $\alpha$ is the hue angle of the color ink (A) and $\beta$ is the hue angle of the color ink (B).

7 Claims, No Drawings

WATER-BASED INK FOR INK-JET RECORDING AND INK-JET RECORDING METHOD

CROSS REFERENCE TO RELATED APPLICATION

This application claims priority to Japanese Patent Application No. 2005-119008 filed on Apr. 15, 2005, the entire disclosure of which is hereby incorporated by reference.

BACKGROUND

In ink-jet recording methods, ink droplets are generally formed by using any of various ink discharge methods. Such ink-jet recording methods include applying a high voltage to form an electrostatic attraction or applying mechanical vibration or displacement to an ink using a piezoelectric element. Another ink-jet recording method heats an ink to generate bubbles and utilizes the resulting pressure. These methods provide ink droplets force to force ink droplets to fly and subsequently adhere as ink dots to a recording material, such as a recording paper, thereby performing the recording. Ink-jet recording methods typically generate less noise than other recording methods and allow high-speed printing or multi-color printing.

Ink-jet recording methods can be used to create images on various types of recording material, for example, plain paper, dedicated recording paper; and optical transparency sheets for slide or overhead projector (OHP). Other ink-jet recording methods utilize a color-separation plate for forming a positive plate for color printing or a color mosaic filter (CMF) for a color display device such as a liquid crystal device.

When a color image is formed by the ink-jet recording method, generally various colors can be developed using a subtractive color mixing method by overprinting inks of three primary colors (yellow (Y), magenta (M) and cyan (C)), on one another in an appropriate combination on the same pixel. For example, for red (R), green (G), blue (B) and black (BK), basically as the combinations of the following expressions:

Y+M→R

Y+C→G

M+C→B

Y+M+C→Bk

Red (R) can be developed by appropriately mixing yellow (Y) and magenta (M), green (G) can be developed by appropriately mixing yellow (Y) and cyan (C), blue (B) can be developed by appropriately mixing magenta (M) and cyan (C), and black (Bk) can be developed by appropriately mixing yellow (Y), magenta (M) and cyan (C). However, when a black image is formed by overprinting inks of three primary colors (yellow, magenta and cyan), on one another, the volume of the ink droplets on a recording material becomes large. The line becomes thicker compared with portions where colors other than black are recorded resulting in an unnatural image, and ink absorption failure of the recording material occurs resulting in lowering of the drying property and the like.

In many cases, text and lines are formed in black ink, thus high optical density, sharpness and lightfastness are required for the black text and black lines. Often, therefore, a black ink is included for ink-jet recording in addition to color inks of yellow, magenta and cyan.

Since black ink has a high optical density per se, when a black image is formed only with a black ink, it is difficult to develop an image having gradations of medium lightness to high lightness, and in particular, it is difficult to reduce the graininess in a black image of high lightness.

Generally, "a black image of a medium lightness to a high lightness" means an image in dark gray to light gray such as an area with a lightness (L*) of about 30 or more and about 80 or less and with a chroma (C*) of about 50 or less.

In response to the problem of the image quality of such a black image of a medium lightness to a high lightness, a method using plural black inks having different densities as black inks has been proposed (U.S. Pat. No. 6,596,065). However, the use of plural black inks having different densities increases the number of inks constituting an ink set, resulting in increased cost and increased size of an ink-jet recording apparatus.

SUMMARY

Two water-based color inks for ink-jet recording having a color relationship such that the two color inks form a black image with gradation in an area of a medium lightness to a high lightness. A black ink provides sharp text and lines.

DETAILED DESCRIPTION

General Overview

Aspects of the invention allow the expression of sharp text and lines in high density black, enable the formation of a high quality gradation image in which the graininess is reduced in a black image of a medium lightness to a high lightness (e.g., an achromatic image in dark gray to light gray), and suppress an increase in the number of inks constituting an ink combination in ink-jet recording.

When two color inks having a color relationship are overprinted, a black image with gradation in an area of a medium lightness to a high lightness can be formed and graininess can be reduced. Moreover, since a black image is formed by overprinting two color inks on each other, the volume of the ink droplets on a recording material is reduced compared with forming a black image by overprinting inks of three primary colors (yellow, magenta and cyan), on one another. Since less ink is present, the drying property of the ink is improved, and the blurring of text and lines is reduced.

Aspects of the invention include a water-based ink combination for ink-jet recording comprising a black ink, and a color ink (A) and a color ink (B) that satisfy a color relationship of the following expression (I):

about $120° \leq |\alpha - \beta| \leq$ about $240°$ (I)

wherein $\alpha$ is the hue angle of the color ink (A) and $\beta$ is the hue angle of the color ink (B).

Further aspects of the invention include a water-based ink set for inkjet recording comprising a black ink, and a color ink (A) and a color ink (B) that satisfy the above-mentioned color relationship.

Further aspects of the invention include water-based ink cartridges for ink-jet recording comprising a black ink cartridge containing black ink, and a color ink (A) cartridge containing the color ink (A) and a color ink (B) cartridge containing the color ink (B) that satisfy the above-mentioned color relationship.

Further aspects utilize a color ink (A) and a color ink (B) satisfying a color relationship of the expression (II)

about $150° \leq |\alpha - \beta| \leq$ about $220°$.

Further aspects of the invention include an ink-jet recording method for forming a black image of a medium lightness to a high lightness by printing the image with the above-mentioned water-based ink combination for ink-jet recording such that a color ink (A) and a color ink (B) are overprinted on each other. As noted in the background, "a black image of a medium lightness to a high lightness" means an image in dark gray to light gray, such as an area with a lightness (L*) of about 30 or more and about 80 or less and with a chroma (C*) of about 50 or less.

By overprinting two color inks (A) and (B) having the above-mentioned color relationship on each other to develop a black image of a medium lightness to a high lightness with reduced graininess and improved gradation can be formed. Accordingly, a gray gradation image of high quality can be formed.

Further, since the ink combination includes a black ink, printing that requires high density black such as text, lines, and the like, can be formed clearly and with high density using the black ink.

Further, the color ink (A) that is one of the two color inks (A) and (B) having the above-mentioned color relationship may be any of a yellow ink, a magenta ink and a cyan ink. A full-color image can be formed using four colors, in which the color ink (B) is added to a yellow ink, a magenta ink and a cyan ink. Therefore, a medium color can be favorably developed, and in particular, the range of color reproduction in the vicinity of the developed color range can be broadened by the color ink (B).

Illustrative Aspects of the Invention

Lightness index (L*), hue angle (h) and chroma (C*) are based on the L* a* b* colorimetric system standardized by the Commission International de l'Eclairage (CIE) in 1976, which is defined in JIS Z 8729 in the Japanese Industrial Standards (JIS).

In accordance with one aspect of the invention, an ink combination for ink-jet recording has a black ink, and a color ink (A) and a color ink (B) that satisfy a color relationship of the following expression (I):

$$\text{about } 120° \leq |\alpha - \beta| \leq \text{about } 240° \quad (I)$$

wherein α is the hue angle of the color ink (A) and β is the hue angle of the color ink (B). In particular, the color relationship satisfies the expression (II)

$$\text{about } 150° \leq |\alpha - \beta| \leq \text{about } 220°.$$

In general, complementary colors are positioned opposite each other on the hue circle and defined as two colors which develop an achromatic color when they are mixed. In fact, whether or not the two color inks develop an achromatic color when they are mixed in ink-jet recording depends not only on the hue angle, but also on the concentration of the coloring agent, the volume of the ink droplets, the viscosity of the ink, the permeability of the ink and the like. It was discovered that when the difference between the hue angles of the two color inks is about 120° to about 240°, in particular about 150° to about 220°, a color considered to be an achromatic color can be developed by mixing them. The color ink (A) and the color ink (B) have a the above-mentioned color relationship, and those satisfying expression (I) or (II) are used.

Further, since the color ink (A) and the color ink (B) are included in the ink combination not for forming a black image with a low lightness (dark color), but for forming a black image of a medium lightness to a high lightness, the lightness indices (L*) of these inks may be relatively high. Moreover, even if the lightness indices (L*) are high, they can be used as color inks for forming a color image without any problem, therefore, the lightness indices (L*) is set to, for example, about 60 or more.

The value of the hue angle of each ink can be obtained by measuring the color with a spectrocolorimeter for a printed material obtained by printing in ink on a glossy paper with an inkjet printer so as to cover 100% of the area of 1200×1200 dpi resolution (e.g., solid printing). In this case, the glossy paper is a paper in which a coated layer for giving surface smoothness is provided on a base paper, and specific examples include a dedicated paper "glossy photo paper, BP60GLA" manufactured by Brother Industries, Ltd., "Kassai (registered trademark) glossy finish" manufactured by Fuji Photo Film Co., Ltd., an inkjet printer paper (glossy paper) manufactured by Kokuyo Co., Ltd., a thick glossy paper manufactured by Kodak Co., Ltd. and the like.

Examples of the inkjet printer that can be used in solid printing for printed materials include a multifunction printer with inkjet printer, MFC-3100C, manufactured by Brother Industries, Ltd. and the like. Examples of the spectrocolorimeter that can be used include SC-T manufactured by Suga Test Instruments Co., Ltd., Spectrolino manufactured by Gretag Macbeth and the like.

The hue angle (h) can be measured, for example, with a light source set to $D_{65}$ and a viewing angle set to 2°.

Any suitable colors may be combined for the color ink (A) and the color ink (B) having the above-mentioned color relationship. For example, the color ink (A) may be any of a yellow ink, a magenta ink and a cyan ink. Accordingly, a five component ink combination could include a yellow ink, a magenta ink and a cyan ink so that a full-color image can be formed, a color ink (B) having the above-mentioned color relationship to any of these colors, and a black ink. With the use of this ink combination, it is possible to favorably develop all of the full-color images by appropriately combining four color inks, the black images of a medium lightness to a high lightness by using two inks having the above-mentioned color relationship and the dark black images with a black ink.

When referring to suitable colors, variations of the colors are contemplated. For example, one skilled in the art understands that yellow can be any of a spectrum of yellow, from dark to light, bright to dull, orange-ish yellow to greenish yellow, etc.

Any of a yellow ink, a magenta ink or a cyan ink can be selected as the color ink (A) for the two color inks (A) and (B) having the above-mentioned color relationship. A yellow ink is particularly suitable because it has a high lightness index (L*) per se. In this case, the color ink (B) is determined to be a bluish ink to a violet-like ink whose hue angle is different from that of the yellow ink by about 120° to about 240° particularly, about 150° to about 220°. In this way, an achromatic color of light gray can be favorably developed, and the range of color that is developed can also be broadened. The color ink (A) and color ink (B) can be overprinted on each other in either order.

Each ink constituting the ink combination for ink-jet recording contains at least water, at least one coloring agent and at least one water-soluble organic solvent.

The coloring agent may be either a water-soluble dye or a pigment. A water-soluble dye, in particular, provides excellent color developing property. A single coloring agent or a combination of more than one coloring agent may be used in each ink.

Suitable water-soluble dyes for use in the color ink include, but are not limited to, C. I. Acid Yellow 11, 17, 23, 25, 29, 42, 61, 71, 79, 99, 110, 207, etc.; C. I. Acid Orange 7, 19, 56, 94, etc.; C. I. Acid Red 1, 6, 32, 37, 51, 52, 80, 85, 87, 92, 94, 109, 115, 180, 227, 249, 254, 256, 289, 315, 317, etc.; C. I. Acid Blue 9, 22, 40, 59, 93, 102, 104, 112, 117, 120, 167, 229, 234, etc.; C. I. Acid Green 3, 15, 25, etc.; C. I. Acid Violet 49, etc.; C. I. Direct Yellow 12, 24, 26, 86, 98, 132, 142, etc.; C. I. Direct Orange 34, 39, 44, 46, 60, etc.; C. I. Direct Red 1, 4, 17, 28, 80, 83, 92, 227, 289, etc.; C. I. Direct Violet 47, 48, etc.; C. I. Direct Blue 6, 22, 25, 71, 86, 87, 90, 106, 199, etc.; C. I. Direct Brown 109, etc.; C. I. Direct Green 59, etc.; C. I. Reactive Red 23, 31, 180, etc.; C. I. Basic Blue 1, 3, 5, 7, 9, 24, 25, 26, 28, 29, etc.; C. I. Basic Red 1, 2, 9, 12, 13, 14, 37, etc.; C. I. Basic Violet 7, 14, 27, etc.; C. I. Food Yellow 3, etc.; and the like.

Suitable pigments for use in the color ink include, but are not limited to, C. I. Pigment Yellow 1, 2, 3, 13, 16, 74, 83, 93, 128, 134, 144, etc.; C. I. Pigment Red 5, 7, 12, 23, 48 (Mn), 57 (Ca), 112, 122, 144, 170, 177, 221, 254, 264, etc.; C. I. Pigment Violet 19, 48 (Ca), etc.; C. I. Pigment Blue 1, 2, 3, 15, 15:1, 15:2, 15:3, 15:4, 15:5, 15:6, 16, 17:1, 22, 27, 28, 29, 36, 60, etc.; C. I. Pigment Green 7, etc.; and the like.

Suitable water-soluble dyes for use in the black ink include, but are not limited to, C. I. Acid Black 2, 7, 24, 26, 31, 52, 63, 112, 118, etc.; C. I. Direct Black 17, 19, 32, 51, 71, 108, 146, 154, 168, etc.; C. I. Basic Black 2; C. I. Food Black 1, 2, etc.; and the like.

Suitable pigments for use in the black ink include, but are not limited to, carbon black such as MA 8, MA 100 (manufactured by Mitsubishi Chemical Corporation) or Color Black FW 200 (manufactured by Degussa). For example, a self-dispersing type carbon black that can be dispersed in water without using a dispersing agent may be used. The self-dispersing type carbon black can be obtained, for example, by a treatment in which at least one kind of hydrophilic group such as a carbonyl group, a carboxyl group, a hydroxyl group or a sulfone group or one kind of salt thereof is attached to its surface. Specific examples of this surface treatment include methods described in U.S. Pat. No. 5,609,671 and WO97/48769. As the self-dispersing black pigment, a commercially available product such as CAB-O-JET (registered trademark) 200 and 300 (manufactured by Cabot Corporation), Bonjet (registered trademark) CW1 (manufactured by Orient Chemical Industries Ltd.) and the like can also be used.

When the coloring agent is a water-soluble dye, the amount of the dye solids can range, for example, from about 0.1 to about 20% by weight, from about 0.5 to about 15% by weight or from about 1 to about 10% by weight of the total amount of the ink. Generally the color developing property is poor when the amount of coloring agent is less than about 0.1% by weight. On the other hand, when the coloring agent exceeds about 20% by weight, clogging of the nozzle of the head for ink-jet recording or the like and precipitating of the water-soluble dye can occur.

When the coloring agent is a pigment, the amount solid of the pigment can range, for example, from about 1 to about 15% by weight or from about 1 to about 10% by weight of the total amount of the ink. Generally the color developing property is poor when the pigment amount is less than about 1% by weight. On the other hand, when the pigment exceeds about 15% by weight, clogging of the nozzle of the head for ink-jet recording or the like and aggregating of the pigment molecules can occur.

Suitable water-soluble organic solvents useful in each ink include, but not limited to, a polyhydric alcohol alkyl ether having low odor and low vapor pressure. Such a polyhydric alcohol alkyl ether serves as a penetrant that effectively accelerates the penetration speed of the ink into a recording material such as a recording paper. Accordingly, the drying property of the ink on a recording material can be improved, bleeding (blurring at the boundary between different colors) resulting from the slow drying property on the recording material can be prevented, and feathering (whisker-shaped blurring caused by the presence of fiber and voids in a recording material) resulting from the penetration can be made less likely to occur.

Specific examples of the polyhydric alcohol alkyl ether include, but are not limited to, diethylene glycol methyl ether, diethylene glycol butyl ether, diethylene glycol isobutyl ether, dipropylene glycol methyl ether, dipropylene glycol propyl ether, dipropylene glycol isopropyl ether, dipropylene glycol butyl ether, triethylene glycol methyl ether, triethylene glycol propyl ether, triethylene glycol butyl ether, tripropylene glycol methyl ether, tripropylene glycol butyl ether and the like.

The amount of the polyhydric alcohol alkyl ether can range, for example, from about 0.3 to about 15% by weight, or from about 0.4 to about 10% by weight of the total amount of each ink. When the amount is less than about 0.3% by weight, the penetration speed of the ink into a recording material such as a recording paper is slow, possibly affecting drying time and causing blurring. On the other hand, when the amount exceeds about 15% by weight, the penetration speed of the ink into a recording material is too fast, possibly causing the ink to penetrate to the back side of a recording material or causing blurring.

Each ink can contain a humectant as the water-soluble organic solvent in order to avoid clogging of the nozzle of the ink-jet head. Examples of the humectant include, but are not limited to, water-soluble glycols such as glycerin, ethylene glycol, diethylene glycol, triethylene glycol, polyethylene glycol, propylene glycol, dipropylene glycol, tripropylene glycol, polypropylene glycol, 1,5-pentanediol, 1,6-hexanediol, etc.

When the amount of the water-soluble organic solvent as the humectant is too small, it may not prevent clogging of the nozzle of the ink-jet head, and when the amount is too much, the viscosity of the ink may increase resulting in difficulty in discharging the ink from the nozzle of the ink-jet head. Typically, therefore, the amount can range, for example, from about 5 to about 50% by weight, from about 10 to about 40% by weight or from about 15 to about 35% by weight of the total amount of each ink.

The water-soluble organic solvent for controlling the penetration of the ink into a recording material such as a recording paper and the drying property of the ink, may also utilize a monovalent alcohol such as ethanol and isopropyl alcohol in each ink.

Water is used in each ink, typically one having a high purity such as ion exchanged water or distilled water. The amount of water can range, for example, from about 10 to about 98% by weight, from about 30 to about 97% by weight or from about 40 to about 95% by weight of the total amount of each ink. When the amount is less than about 10% by weight, the viscosity of the ink increases, ank ink jetting is liable to be difficult. On the other hand, when the amount exceeds about 98% by weight, the coloring agent may precipitate or aggregate due to evaporation of water resulting in clogging of the nozzle of the ink-jet head.

In addition to the respective components described above, it is also possible to add any of a dispersing agent, a viscosity-adjusting agent, a surface tension-adjusting agent, a pH-adjusting agent, an antiseptic and antifungal agent and the like to each ink as needed.

Water-based ink sets can be produced for ink-jet recording comprising a black ink, and a color ink (A) and a color ink (B)

that satisfy the above-mentioned color relationship. Such sets can be, for example sold together (e.g. in a single package) or by combining different inks to form the set in the ink-jet recording apparatus.

Water-based ink cartridges for ink-jet recording can comprise a black ink cartridge containing black ink, and a color ink (A) cartridge containing the color ink (A) and a color ink (B) cartridge containing the color ink (B) that satisfy the above-mentioned color relationship.

The water-based ink combination for ink-jet recording can be applied to an ink-jet recording method such as an electrostatic attraction method, a method using a piezoelectric element, a thermal method or the like.

The ink-jet recording method comprises forming a black image of a medium lightness to a high lightness by printing the image with the water-based ink combination for ink-jet recording such that the color ink (A) and the color ink (B) are overprinted on each other. Conventional ink-jet recording material and an ink-jet head can be used.

In accordance with the ink-jet recording method, a black image of a medium lightness to a high lightness is formed and a gray gradation image of high quality with reduced graininess can be formed.

Further, in accordance with the ink-jet recording method, a dark black image is formed with a black ink, therefore, sharp black text and lines can be formed

EXAMPLES 1 TO 4 AND COMPARATIVE EXAMPLES 1 TO 3

(1) Preparation of Inks

A blue ink (B 1) was prepared as follows to have the ink composition shown in Table 1. First, 76.8 parts by weight of water, 18.0 parts by weight of glycerin, 2.0 parts by weight of dipropylene glycol propyl ether were mixed thereby preparing 96.8 parts by weight of an ink solvent. Then, while stirring this ink solvent, 3.2 parts by weight of C. I. Acid Blue 112 was added thereto, and the mixture was stirred for an additional 30 minutes. Then, the mixture was filtered through a membrane filter with a pore size of 2.5 μm, whereby a blue ink (B1) was obtained.

In the same manner as the blue ink (B1), a violet ink (VI), a green ink (G1), yellow inks (Y1 to Y4), magenta inks (M1 and M2), cyan inks (C1 and C2) and black inks (Bk1 to Bk3) were prepared.

(2) Measurement of L*, a*, b*, C* and h of the Color of each Ink.

Each of the prepared inks were filled in an ink cartridge, respectively, and installed in a multifunction printer with inkjet printer (MFC-3100C manufactured by Brother Industries, Ltd.). Then, printing was carried out on a recording paper (dedicated paper, glossy photo paper, BP60GLA, manufactured by Brother Industries, Ltd.) so as to cover 100% of the area of 1200×1200 dpi resolution.

According to JIS Z 8729, the lightness index (L*), the chromaticness indices (a* and b*) of the obtained printed materials were measured with a spectrocolorimeter (SC-T manufactured by Suga Test Instruments Co., Ltd.) (light source: $D_{65}$, viewing angle: 2°). Further, the chroma (C*) and the hue angle (h) were obtained using the following equations (1) and (2).

$$C^* = \sqrt{(a^*)^2 + (b^*)^2} \quad (1)$$

when $a^* \geq 0$ and $b^* \geq 0$: $h = \tan^{-1}(b^*/a^*)$
when $a^* \geq 0$ and $b^* < 0$: $h = 360 + \tan^{-1}(b^*/a^*)$
when $a^* < 0$: $h = 180 + h = \tan^{-1}(b^*/a^*)$ The measurement results are shown in Table 1.

| | | B1 | V1 | G1 | Y1 | Y2 | Y3 | Y4 | M1 | M2 | C1 | C2 | Bk1 | Bk2 | Bk3 |
|---|---|---|---|---|---|---|---|---|---|---|---|---|---|---|---|
| Ink composition (% by weight) | C.I. Acid Blue 112 | 3.2 | | | | | | | | | | | | | |
| | C.I. Direct Violet 48 | | 3.0 | | | | | | | | | | | | |
| | C.I. Acid Green 3 | | | 3.0 | | | | | | | | | | | |
| | C.I. Direct Yellow 86 | | | | 2.4 | | | | | | | | | | |
| | C.I. Acid Yellow 99 | | | | | 3.2 | | | | | | | | | |
| | C.I. Direct Yellow 132 | | | | | | 2.4 | | | | | | | | |
| | C.I. Acid Yellow 23 | | | | | | | 3.0 | | | | | | | |
| | C.I. Acid Red 254 | | | | | | | | 3.0 | | | | | | |
| | C.I. Acid Red 249 | | | | | | | | | 2.6 | | | | | |
| | C.I. Direct Blue 86 | | | | | | | | | | 2.5 | | | | |
| | C.I. Direct Blue 199 | | | | | | | | | | | 2.5 | | | |
| | Black pigment dispersing element (*1) | | | | | | | | | | | | 5.0 | | |
| | Black pigment (*2) | | | | | | | | | | | | | 4.0 | |
| | C.I. Direct Black 17 | | | | | | | | | | | | | | 6.0 |
| | Glycerin | 18.0 | 30.0 | 27.0 | 25.0 | 25.0 | 20.0 | 18.0 | 25.0 | 24.0 | 26.0 | 26.0 | 30.0 | 27.0 | 25.0 |
| | Dipropylene glycol propyl ether | 2.0 | | 2.0 | | 2.0 | | | | | 2.0 | | | 1.5 | |
| | Triethylene glycol butyl ether | | 3.0 | | | | 4.0 | 3.0 | | 4.0 | | 3.5 | | | 4.0 |
| | Triethylene glycol propyl ether | | | | 0.4 | | | | 0.5 | | | | 0.4 | | |
| | Ultrapure water | 76.8 | 64.0 | 68.0 | 72.2 | 69.8 | 73.6 | 76.0 | 70.5 | 69.4 | 69.5 | 68.0 | 64.6 | 67.5 | 65.0 |
| Measured value | L* | 49 | 48 | 70 | 85 | 82 | 88 | 88 | 44 | 52 | 59 | 56 | 18 | 16 | 28 |
| | a* | 0 | 20 | −45 | 6 | 8 | −10 | −11 | 85 | 80 | −25 | −28 | 4 | 3 | 0 |
| | b* | −64 | −30 | −8 | 94 | 62 | 102 | 109 | −19 | −6 | −38 | −51 | −4 | −2 | −2 |
| | h/° | 270 | 304 | 190 | 86 | 83 | 96 | 96 | 347 | 356 | 237 | 242 | 314 | 326 | 262 |
| | C* | 64 | 38 | 45 | 94 | 63 | 102 | 109 | 87 | 81 | 46 | 58 | 6 | 4 | 2 |

(*1) CAB-O-JET (registered trademark) 300 (Carbon black concentration: 15%, manufactured by Cabot Corporation)
(*2) MA 100 (manufactured by Mitsubishi Chemical Corporation)

(3) Preparation of Ink Sets

The inks shown in Table 1 were combined as shown in Table 2, and ink sets of Examples 1 to 4 and Comparative Examples 1 to 3 were prepared.

(4) Hue of Black Image (a Medium Lightness to a High Lightness)

Each ink set was installed in a multifunction printer with inkjet printer (MFC-3100C. manufactured by Brother Industries, Ltd). Then, a patch pattern was printed on a paper for evaluation (dedicated paper, glossy photo paper, BP60GLA, manufactured by Brother Industries, Ltd.) so as to cover 100% of the area of 1200×1200 dpi resolution.

The patch pattern was printed with a printer driver capable of printing by altering the ratio of the color ink (A) to the color ink (B) to 1:9, 2:8, 3:7, 4:6, 5:5, 6:4, 7:3, 8:2 and 9:1. However, as for the ink set of Comparative Example 1, the patch pattern was printed with a printer driver capable of printing by adjusting the respective ratios of three color inks (A), (B) and (C) at ten stages.

As for the obtained printed materials, by using a spectrocolorimeter (SC-T manufactured by Suga Test Instruments Co., Ltd.), the color with an L* value of the patch patterns of the respective Examples and Comparative Examples in the range from 40 to 70 was measured (light source: $D_{65}$, viewing angle: 2°), and the chroma (C*) and the hue angle (h) were calculated from the obtained measurement values in the same manner as described above. Then, from the value of the chroma (C*), the hue of a black image of a medium lightness to a high lightness (medium color to light color) were evaluated in four grades based on the following criteria. The results are shown in Table 2.

A: $C^* \leq 25$
B: $25 < C^* \leq 50$
C: $50 < C^* \leq 75$
D: $75 < C^*$

In this evaluation, when the hue is evaluated as A or B, a black image of a medium lightness to a high lightness can be favorably developed, when the hue is evaluated as C, a color is rendered and a black image cannot be favorably developed, and when the hue is evaluated as D, a black image cannot be developed.

(5) Evaluation of Graininess

In the same manner as in (4), each ink set was installed in the multifunction printer with inkjet printer. Then, a gradation pattern in which a range between a solid color composed of the color ink (A) and the color ink (B) at a 100% duty and a 0% duty in density was divided into 256 tones (i.e., a 256-tone gradation pattern from black to white) was printed as a printing data on a paper for evaluation (dedicated paper, glossy photo paper, BP60GLA, manufactured by Brother Industries, Ltd.). However, as for the ink set of Comparative Example 1, a similar gradation pattern was printed using the three color inks (A), (B) and (C).

The obtained printed materials were evaluated in four grades based on the following criteria for the visibility of the dots of inks as the graininess. The results are shown in Table 2.

A: Dots are not visible.
B: Dots are hardly visible.
C: Dots are slightly visible.
D: Dots are visible.

(6) Evaluation of Blurring

In the same manner as in (4), each ink set was installed in the multifunction printer with inkjet printer. Then, a line was printed on a paper for evaluation (dedicated paper, glossy photo paper, BP60GLA, manufactured by Brother Industries, Ltd.), and its Rag was measured and evaluated in four grades based on the following criteria. The results are shown in Table 2.

A: $Rag < 3$
B: $3 \leq Rag < 5$
C: $5 \leq Rag < 10$
D: $10 \leq Rag$

Here, Rag is the raggedness of a line defined in ISO 13660. A ragged line means a line in a state that the line undulates with respect to an ideal line edge that should be smooth and straight by nature.

(7) Evaluation of Drying Property

In the same manner as in (4), each ink set was installed in the multifunction printer with inkjet printer. Then, a solid color of a 100% duty was printed on a paper for evaluation (dedicated paper, premium high quality paper, BP60PA, manufactured by Brother Industries, Ltd.). The surface of the paper for evaluation was rubbed with a finger 3 minutes after the printing, and the degree of the detachment of the coloring agent was visually observed. The drying property was evaluated in four grades based on the degree of the detachment. The results are shown in Table 2.

A: No detachment of the coloring agent is observed.
B: Slight detachment of the coloring agent is observed (less than 20% of the total coloring agent).
C: Some detachment of the coloring agent is observed (20% or more and less than 40% of the total coloring agent).
D: Significant detachment of the coloring agent is observed (40% or more of the total coloring agent)

|  |  | Example 1 | Example 2 | Example 3 | Example 4 | Comp. Example 1 | Comp. Example 2 | Comp. Example 3 |
|---|---|---|---|---|---|---|---|---|
| Ink set | Black ink | Bk1 | Bk2 | Bk3 | Bk1 | — | Bk1 | Bk3 |
|  | Color ink (A) | Y1 | Y2 | Y4 | G1 | Y3 | M1 | C2 |
|  | Color ink (B) | B1 | B1 | V1 | M2 | B1 | Y1 | Y3 |
|  | Color ink (C) | — | — | — | — | C1 | — | — |
|  | $|\alpha - \beta|/°$ | 184 | 187 | 208 | 166 | 174 | 261 | 146 |
| Evaluation | L* | 48 | 56 | 59 | 56 | 54 | 45 | 40 |
|  | a* | −43 | −19 | 9 | 29 | −28 | 72 | −61 |
|  | b* | 20 | −30 | 22 | −23 | −15 | 52 | 29 |
|  | h/° | 155 | 238 | 68 | 321 | 208 | 36 | 155 |
|  | C* (a medium lightness to a high lightness) | 47 | 35 | 23 | 37 | 32 | 89 | 67 |
|  | Hue (a medium lightness to a high lightness) | B | B | A | B | B | D | D |
|  | Graininess | A | B | A | B | B | C | C |
|  | Blurring | A | A | B | A | D | B | A |
|  | Drying property | A | A | A | B | D | A | B |

From the results of Table 2, it is found that gray color with various gradations can be developed by combining the two color inks (A) and (B) having the above-mentioned color relationship and an image with reduced graininess can be formed in the ink sets of Examples 1 to 4. In addition, the ink sets of Examples 1 to 4 also include a black ink, therefore, a realistic black image with a high optical density can be developed.

Further, as for the ink sets of Examples 1 to 4, since a black image of a medium lightness to a high lightness is formed with the two color inks (A) and (B) having the above-mentioned color relationship, the necessary amount of ink is reduced compared with Comparative Example 1 in which a black image is formed with inks of three primary colors (yellow, magenta and cyan), and it is found that they are excellent in terms of blurring and drying property.

When an ink set including four colors in which the color ink (A) is any of a yellow ink, a magenta ink and a cyan ink, and the color ink (B) is added thereto is used, a favorable medium color can be developed compared with a three primary color ink set including a yellow ink, a magenta ink and a cyan ink, and an excellent image reproducibility and a broad color reproducibility can be realized.

On the other hand, as for the ink sets of Comparative Examples 2 and 3, since they include a black ink, a realistic black image with a high optical density can be formed. However, even if the two color inks (A) and (B) are combined, they do not satisfy the above-mentioned color relationship of the expression (I), therefore, a black image of a medium lightness to a high lightness cannot be developed. Accordingly, a black image of a medium lightness to a high lightness has to be developed with only the black ink, graininess remained on the gray image of various gradations.

The water-based ink set for ink-jet recording of the invention is useful for ink-jet recording for forming a high quality gradation image in which the graininess is reduced in a black image of a medium lightness to a high lightness and a full-color image excellent in color reproducibility.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. An ink-jet recording method for forming a black image of a lightness (L*) of medium lightness to a high lightness wherein lightness (L*) is between about 30 and about 80 and a chroma (C*) is about 50 or less, comprising printing the image by overprinting a water-based color ink (A) and a water-based color ink (B), wherein the color ink (A) and the color ink (B) satisfy a color relationship of the following expression (I):

$$\text{about } 120° \leq |\alpha - \beta| \leq \text{about } 240° \quad (I)$$

wherein α is the hue angle of the color ink (A) and β is the hue angle of the color ink (B).

2. The ink-jet recording method according to claim 1 wherein the color ink (A) and the color ink (B) satisfy a color relationship of the following expression (II):

$$\text{about } 150° \leq |\alpha - \beta| \leq \text{about } 220° \quad (II).$$

3. The ink-jet recording method according to claim 1 wherein the color ink (A) is at least one of a yellow ink, a magenta ink and a cyan ink.

4. The ink-jet recording method according to claim 3 wherein the color ink (A) is the yellow ink.

5. The ink-jet recording method according to claim 4 wherein the color ink (B) is a blue ink or a violet ink.

6. The ink-jet recording method according to claim 1 comprising at least a yellow ink, a magenta ink and a cyan ink wherein one of the yellow ink, magenta ink and cyan ink is the color ink (A).

7. The ink-jet recording method according to claim 1 further comprising forming a high density black text or lines by printing with black ink.

* * * * *